United States Patent [19]
Holroyd et al.

[11] Patent Number: 4,992,035
[45] Date of Patent: Feb. 12, 1991

[54] VEHICLE TIRE MOLD

[75] Inventors: Eric Holroyd, Knutsford; Colin Holroyd, Crossens, both of England

[73] Assignee: Apsley Metals Limited, United Kingdom

[21] Appl. No.: 459,559

[22] Filed: Jan. 2, 1989

Related U.S. Application Data

[62] Division of Ser. No. 198,520, May 25, 1988, Pat. No. 4,921,673.

[30] Foreign Application Priority Data

Jul. 14, 1987 [GB] United Kingdom ............... 8716494

[51] Int. Cl.$^5$ ................... B29C 33/00; B29C 33/40; B29C 35/00
[52] U.S. Cl. ................................ 425/32; 425/46; 425/195
[58] Field of Search ................ 425/46, 195, 28.1, 32

[56] References Cited

U.S. PATENT DOCUMENTS

| | | | |
|---|---|---|---|
| 1,007,434 | 10/1911 | Destribats | 425/46 |
| 1,209,607 | 12/1916 | Michelin | 425/46 |
| 1,346,232 | 7/1920 | Midgley | 425/35 |
| 1,482,325 | 1/1924 | Shively | 425/46 |
| 2,990,874 | 7/1961 | Hawkinson | 425/20 |
| 3,240,653 | 3/1966 | Mattox et al. | 425/22 |
| 4,053,265 | 10/1977 | Wulker et al. | 425/20 |
| 4,553,918 | 11/1985 | Yoda et al. | 425/46 |

Primary Examiner—Willard E. Hoag
Attorney, Agent, or Firm—Stevens, Davis, Miller & Mosher

[57] ABSTRACT

An apparatus for the manufacture of pneumatic vehicle tires including a mold for forming a tread pattern on the ground contacting surface of the tire. The tread mold 23 has an inner surface 24 in which a closely fitting open network grid 10 is removably positioned. The grid has at least one axial split therein to allow removal of the grid from the tire after its curing is completed.

6 Claims, 3 Drawing Sheets

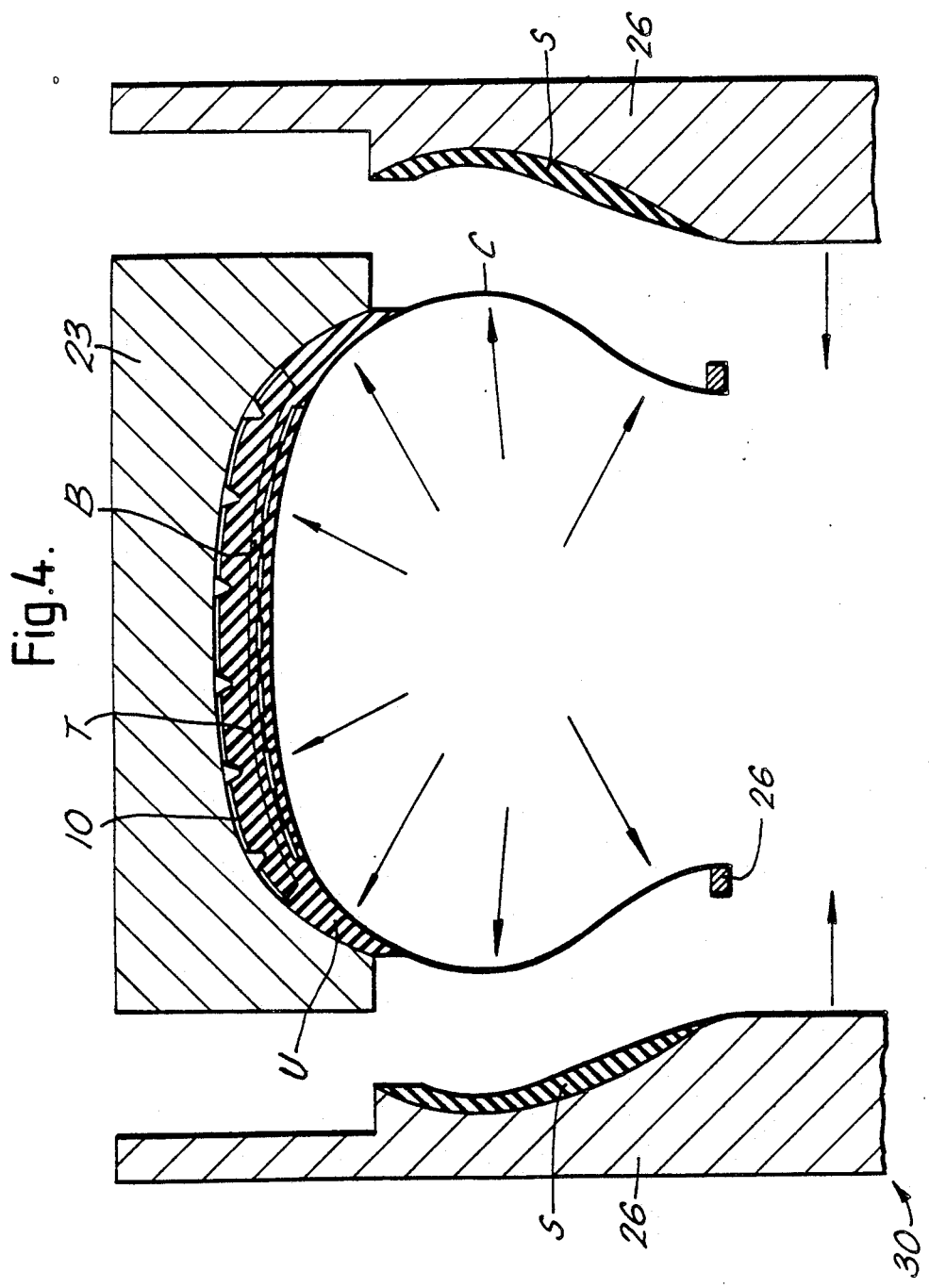

VEHICLE TIRE MOLD

This is a Divisional of application Ser. No. 198,520 filed May 25, 1988 now U.S. Pat. No. 4,921,673.

This invention relates to an apparatus for manufacture of tires and particularly to a molding apparatus for the ground contacting tread of a tire. The mold had an open network grid that is removably mounted on the inner surface of the tire mold.

A typical tire mould has a tread portion for forming the tread of the tire, on which there are formed a series of ribs and/or lugs corresponding to the grooves and sipes to be formed on the tread of the tire. Conventionally these ribs etc., are formed integrally on the inner surface of the tread portion of the mould by machining metal mould castings. These conventional moulds require replacement of the entire tire mould if it is required to change the tread pattern, or if a section of the tread pattern mould is damaged.

In U.S. Pat. No. 4,553,918 and U.S. Pat. No. 4,576,554 there is described a tire mould in which the tread pattern is formed by use of a separate mould attachment which is secured to the internal surface of the tread area of the tire mould. This detachable mould attachment is in the form of a latticework having ribs and/or lugs which correspond to the recesses in the tire thread. This latticework may be in circular form and comprises a plurality of arcuate segments which are each fixed to the internal surface of the tire mould. However this system has the disadvantage that the latticework ring is secured to the inside of the mould so that a change of latticework involves a large amount of mould down time. The present invention provides a flexible tire manufacturing method in which the same mould can be utilized for the manufacture of different tires having different tread patterns without the necessity of having to take the respectively mould out of production operations to change parts thereof. Accordingly there is provided a method of manufacture of a gree tire having a ground contacting tread with grooves therein, said method including the steps of:

forming a cylindrical grid comprising a network of ribs and/or lugs for forming grooves in the tread;
filling the grid with uncured tread rubber compound;
locating a tire carcass concentrically within the grid with tread compound insitu to assemble the tread to the carcass.

By the term 'green' tire is meant an uncured tire. Preferably other tire components are assembled to the carcass and tread with grid insitu and the green tire is cured with grid insitu in the tread.

In the manufacture of a radial tire, a breaker is located concentrically with the tread. Preferably the cylindrical grid is located in a close fitting cylindrical tread mould prior to the uncured tread compound being expanded within the grid to fully form the tread pattern.

Preferably the cylindrical grid is located in a close fitting cylindrical tread mould prior to the uncured tread compound being expanded within the grid to fully form the tread pattern.

The advantage of utilizing a separate cylindrical grid is that the same tire mould can be used for the manufacture of tires with different tread patterns simply by changing the grid. The grid would be made in the form of a plastic moulding which is flexible enough to be strippled off the cured tire, and be sufficiently cheap to manufacture that the grid could be discarded after moulding a predetermined number of tires.

Also according to this invention there is provided an apparatus for manufacturing tires and which comprises a mould body having an inner cylindrical surface corresponding to the contour of at least the tread of the tire to be moulded, a network grid for forming grooves in the surface of the tread and which is unattached to the mould, said network grid being in the form of a cylinder with at least one axial split therein and being a close fit within the mould body preferably a slide fit.

The invention will be described by way of example and with reference to the accompanying drawings in which:

FIG. 4 shows the tread mould ring with assembled tire insitu, and the addition of the sidewall moulds to form the final tire cure mould.

Figure 1:
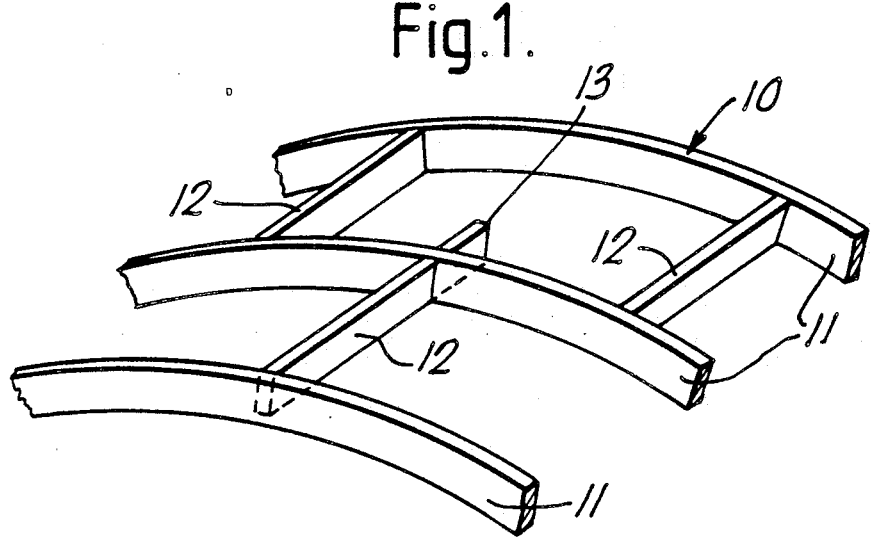
FIG. 1 is a perspective view of a fragmentary part of grid utilized in the present invention.

With reference now to FIG. 1 of the drawings, there is illustrated a fragmentary portion of a cylindrical open network grid 10 comprising circumferential ribs 11 which are joined together by axially directed ribs 12. The axial ribs 12 may be extended through the circumferential ribs 11 to form projections 13 if required. While the grid is described as cylindrical, this term also embraces grids which have an arcuate radial cross-section in order to follow the curved crown of a tire tread.

While the above example will produce a very simple block pattern tread there is no reason why more complicated tread patterns could not be produced in this manner. The cylindrical grid 10 formed in this manner could be of cast aluminium and have at least one axial split therein so that the cylindrical grid can be expanded for removal from the finished tire.

If only one split is utilized it will be necessary to have a hinge on the diameterically opposite side of the grid. Alternatively a number of arcuate segments can be used to make up the gride.

In an alternative form the cylindrical grid 10 could be moulded from nylon with one axial split thereon to produce a flexible grid which can be stripped from a finished tire. It may also be possible to form the grid by hot forming nylon strip in repeated operations of a punch of suitable configuration.

To form blades or sipes (see FIG. 2) there is provided an outer cylinder 21 which is made of sheet metal having the blades 22 formed in the sheet. The outer cylinder may have at least one axial slit thereon to allow it to be easily removed from the finished tire. With reference to FIG. 3 the grid 10 is located in a close fitting cylindrical tread mould body 23 having an inner surface 24 corresponding to the contour of at least the tread. The tread mould body 23 is of suitable proportions to withstand normal tire moulding pressures. The cylindrical grid 10 may have raised portions 25 on the circumferential ribs 11 to co-operate with apertures or slots in the mould surface 24 to aid location of the grid within the tread mould body 23.

Figure 2:
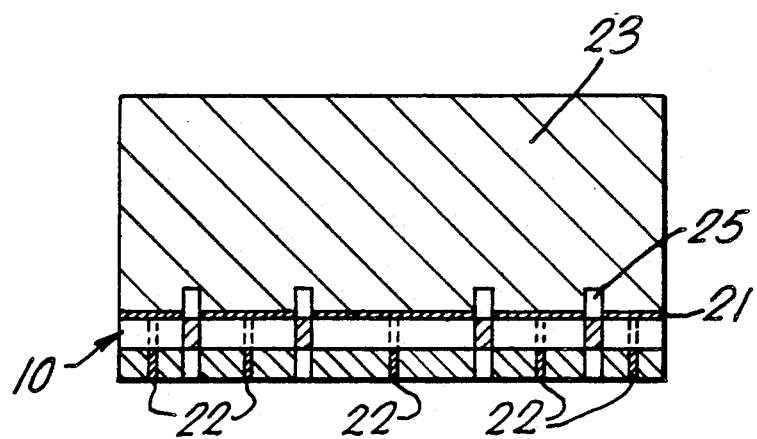
FIG. 2 is a schematic radial cross-section through a mould ring showing the grid insitu.
Figure 3:
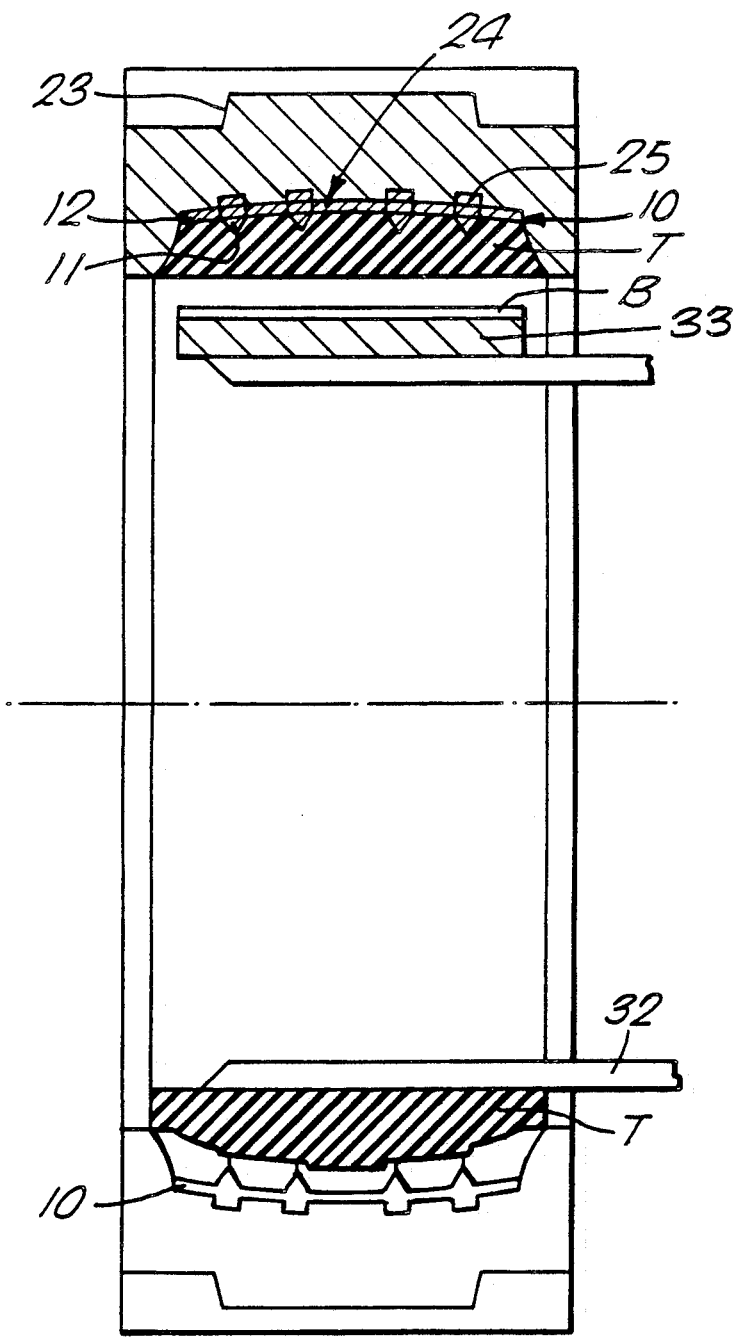
FIG. 3 is a cross section through a mould ring showing the gride insitu and the tread and breaker being placed into position.

FIG. 2 shows in schematic form an alternative apparatus in which an outer cylinder 21 having blades 22 thereon is located in the tread mould body 23 between the mould inner surface 24 and the grid 10. The raised portions 25 on the ribs 11 project through co-operating apertures in the outer cylinder for location in the mould body 23.

The completed mould is illustrated in FIG. 4, which shows a tread mould body 23 having the grid 10 located therein. The tread T, and undertread U and breakers B, have been placed into the mould body 23 in a manner to be described, and a tire carcass assembly C inflated within the mould body 23. The tire curing mould is then completed by a pair of sidewall moulds 26 with sidewalls S therein that are brought into engagement with the inflated carcass.

In the preferred process for manufacture of a radial carcass pneumatic tire, the circular grid 10 is assembled and placed into the closely fitting tread mould body 23. A package of tread compound T is delivered by tread serve means 32 to be concentric with the mould body and the server means 32 is expanded within the grid 10 to fully form the tread pattern (see bottom half of FIG. 3). The tread server 33 is then collapsed and withdrawn. At this stage it may be desired to add an undertread U (see FIG. 4).

A breaker package B is then delivered by a server means 33 to be concentric with the tread T and the belt is then assembled to the tread T while it is insitu in the mould body (see top half of FIG. 3). The serving means 32 and 33 for the tread and breaker packages are more fully described in GB No. 2133357A.

A complete tire carcass assembly C, built at another station is then transferred in its flat state to be concentric with the tread T and breaker b in the tread mould body 23. The carcass C is then inflated to a toroidal shape to assemble the carcass C to the tread/breaker assembly. The tire curing mould 30 (FIG. 4) is then completed by the addition of sidewall moulds 26 with sidewalls S thereon. Again this process is more fully described in GB No. 2133357A.

The tire is than cured, and removed from the mould complete with the grid 10 institu in the tread T. The grid 10 is then opened and stripped from the tire, so that the grid can then be cleaned and refitted in a tread mould body 23 for the next tire.

In alternative processes, the cylindrical grid 10 can be fillied with tread compound at one station, and then brought to an inflated toroidal carcass assembly C at a second station. The cylindrical grid 10 and thread T are then opened up at an axial split to allow the grid 10 plus tread to be placed over the carcass assembly C. The grid 10 is then closed to fit the tread around the casing. Any extruded surplus material may be removed at this stage.

The carcass assembly C and grid 10 stay together and receive sidewall etc., until the tire is finally assembled, and then cured.

The above system gives great flexibility in that the same tread mould body 23 can be utilized with a large number of different patterned grids 10.

We claim:

1. A tire manufacturing apparatus comprising:
a tread mold having an inner surface for forming the ground contacting outer surface of the tread of a cured tire to be molded therein,
a cylindrical grid which is a close fit within the tread mold and which is removable therefrom with a tire cured in the mold, said grid comprising an open network of ribs or lugs for forming grooves in the tread and location means for locating the grid internally of said inner surface without attachment thereto, the cylindrical grid having at least one coaxial split to allow the grid to be removed from the cured tire.

2. A tire manufacturing apparatus as claimed in claim 1 wherein the cylindrical grid has outwardly radially projecting portions thereon the co-operated with apertures on the tread mould body to locate the grid with respect to the tread mould body.

3. An apparatus as claimed in claim 1 and further including a pair of sidewall molds which are engageable with the tread mold body to form a tire curing mould.

4. An apparatus as claimed in claim 1 wherein there is further provided a further cylindrical body which locates within the inner surface of the tread mold externally of the grid and which has thereon a scattering of blades for forming sipes in the tread that co-ordinate with the tread grooves formed by the grid.

5. An apparatus as claimed in claim 1 wherein the cylindrical grid is a flexible grid that can be strippled from the cured tire.

6. An apparatus as claimed in claim 1 wherein the cylindrical grid is a rigid grid comprising a plurality of arcuate segments that are withdrawn radially from the cured tire.

* * * * *

UNITED STATES PATENT AND TRADEMARK OFFICE
CERTIFICATE OF CORRECTION

PATENT NO.  : 4,992,035
DATED       : February 12, 1991
INVENTOR(S) : Eric Holroyd, et al.

It is certified that error appears in the above-identified patent and that said Letters Patent is hereby corrected as shown below:

On the first page (title page), the filing date should read:
-- [22] Filed:  Jan. 2, 1990--

Column 4, line 41, "strippled" should read -- stripped --.

Signed and Sealed this

Twenty-seventh Day of October, 1992

Attest:

DOUGLAS B. COMER

*Attesting Officer*   *Acting Commissioner of Patents and Trademarks*